(12) United States Patent
Usami

(10) Patent No.: US 11,791,718 B2
(45) Date of Patent: Oct. 17, 2023

(54) POWER CONVERTING DEVICE

(71) Applicant: TOSHIBA TEC KABUSHIKI KAISHA, Tokyo (JP)

(72) Inventor: Yutaka Usami, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 17/221,955

(22) Filed: Apr. 5, 2021

(65) Prior Publication Data

US 2022/0037995 A1 Feb. 3, 2022

(30) Foreign Application Priority Data

Aug. 3, 2020 (JP) ................................. 2020-131343

(51) Int. Cl.
*H02M 1/42* (2007.01)
*H02M 3/335* (2006.01)

(52) U.S. Cl.
CPC ..... *H02M 1/4208* (2013.01); *H02M 3/33576* (2013.01); *H02M 1/4225* (2013.01); *H02M 1/4233* (2013.01)

(58) Field of Classification Search
CPC . H02M 1/4208; H02M 1/4225; H02M 1/4233
See application file for complete search history.

(56) References Cited

U.S. PATENT DOCUMENTS 9,667,136 B1 * 5/2017 Lin ..................... H02M 1/4208
9,780,691 B1 * 10/2017 Usami .................. H02M 7/217

(Continued)

FOREIGN PATENT DOCUMENTS

| CN | 109004850 | 12/2018 |
| CN | 109507469 | 6/2019 |
| JP | 2016-152655 | 8/2016 |

OTHER PUBLICATIONS

Extended European Search Report for European Patent Application No. 21173415.7 dated Oct. 14, 2021.

(Continued)

*Primary Examiner* — Gary A Nash
(74) *Attorney, Agent, or Firm* — AMIN, TUROCY & WATSON, LLP

(57) ABSTRACT

A power converting device includes a totem pole type power factor improving circuit and a control circuit. The totem pole type power factor improving circuit includes a coil connected to a first terminal of an AC power supply, a first half-wave switch in which a source terminal is connected to the coil via a first current detector, a second half-wave switch in which a drain terminal is connected to the coil via a second current detector, a first diode in which a cathode is connected to a drain terminal of the first half-wave switch and an anode is connected to a second terminal of the AC power supply, a second diode in which an anode is connected to a source terminal of the second half-wave switch and a cathode is connected to the second terminal of the AC power supply, and a smoothing capacitor connected between the cathode of the first diode and the anode of the second diode. The control circuit controls the pulse width to turn on or off the first half-wave switch and the second half-wave switch based on a total value of a result of detecting the DC voltage of the first current detector and a result of detecting the DC voltage of the second current detector.

15 Claims, 9 Drawing Sheets

(56) References Cited

U.S. PATENT DOCUMENTS

| | | | | |
|---|---|---|---|---|
| 10,122,262 | B1* | 11/2018 | Wang | H02M 1/4233 |
| 10,224,809 | B1* | 3/2019 | Agrawal | H02M 1/4208 |
| 2008/0101103 | A1* | 5/2008 | Sato | H02M 3/33507 |
| | | | | 363/97 |
| 2010/0225286 | A1* | 9/2010 | Osaka | H02M 3/1584 |
| | | | | 323/272 |
| 2014/0233289 | A1* | 8/2014 | Zhao | H02M 7/53875 |
| | | | | 363/131 |
| 2015/0180330 | A1* | 6/2015 | Ye | H02M 7/46 |
| | | | | 363/126 |
| 2017/0033706 | A1* | 2/2017 | Usami | H02M 1/0085 |
| 2017/0366098 | A1* | 12/2017 | Gong | H02M 1/42 |
| 2018/0219474 | A1* | 8/2018 | Greetham | H02M 1/12 |
| 2019/0123661 | A1* | 4/2019 | Iyasu | H02M 7/219 |
| 2019/0146014 | A1* | 5/2019 | Pohlmann | H02M 1/32 |
| | | | | 324/127 |
| 2019/0172683 | A1* | 6/2019 | Mavretic | H01L 28/40 |

OTHER PUBLICATIONS

Duropean Office Action for European Patent Application No. 21173415.7 dated Dec. 14, 2022.

* cited by examiner

FIG. 6
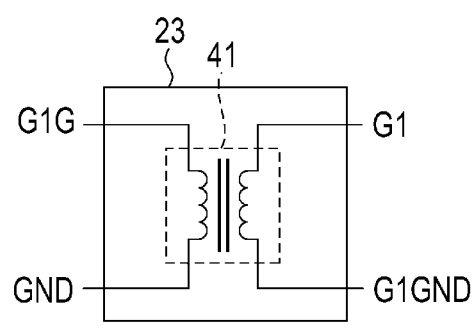
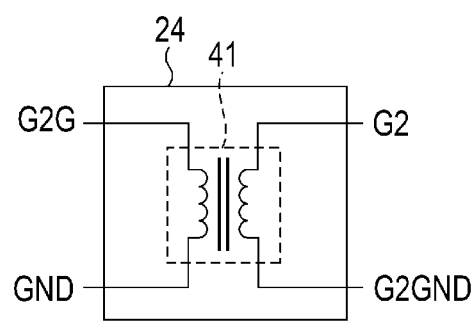

POWER CONVERTING DEVICE

CROSS-REFERENCE TO RELATED APPLICATION

This application is based upon and claims the benefit of priority from Japanese Patent Application No. 2020-131343, filed on Aug. 3, 2020, the entire contents of which are incorporated herein by reference.

FIELD

Embodiments described herein relate generally to a power converting device.

BACKGROUND

A power converting device converts an alternating current (AC) voltage that can be obtained from an AC power supply into a direct current (DC) voltage and supplies power to a load. When the AC voltage of the AC power supply is converted into the DC voltage, converting an AC current flowing through the AC power supply into a sinusoidal shape having the same phase as the AC voltage has the best power factor and low harmonic noise. For example, the power converting device includes a totem pole type power factor improving circuit for converting an input current into a sinusoidal shape.

In order to control the totem pole type power factor improving circuit, it is necessary to detect the AC current flowing according to the input AC voltage. For example, a power converting device including a current transformer that detects a current is put into practical use. However, in such a configuration, a detection result of the AC current is output as a positive or negative signal. Accordingly, the result of detecting a current cannot be directly used for a control IC for controlling the totem pole type power factor improving circuit. Therefore, it is necessary to convert the result of detecting the current into a signal with reference to any GND, that is, to insulate, which causes a circuit to become complicated. In addition, the current transformer is expensive, and thus the cost increases.

DESCRIPTION OF THE DRAWINGS

FIG. 6 is a diagram for illustrating an example of a configuration of a first insulating driver and a second insulating driver, according to an embodiment;

DETAILED DESCRIPTION

Embodiments provide a power converting device including a totem pole type power factor improving circuit capable of high-efficiency power conversion with a simple and easy configuration.

In general, according to one embodiment, the power converting device includes a totem pole type power factor improving circuit and a control circuit. The totem pole type power factor improving circuit includes a coil connected to a first terminal of an AC power supply, a first half-wave switch in which a source terminal is connected to the coil via a first current detector, a second half-wave switch in which a drain terminal is connected to the coil via a second current detector, a first diode in which a cathode is connected to a drain terminal of the first half-wave switch and an anode is connected to a second terminal of the AC power supply, a second diode in which an anode is connected to a source terminal of the second half-wave switch and a cathode is connected to the second terminal of the AC power supply, and a smoothing capacitor connected between the cathode of the first diode and the anode of the second diode. The control circuit controls a pulse width to turn on or off the first half-wave switch and the second half-wave switch based on a total value of a result of detecting the DC voltage of the first current detector and a result of detecting the DC voltage of the second current detector.

Hereinafter, embodiments will be described with reference to the drawings.

Figure 1:
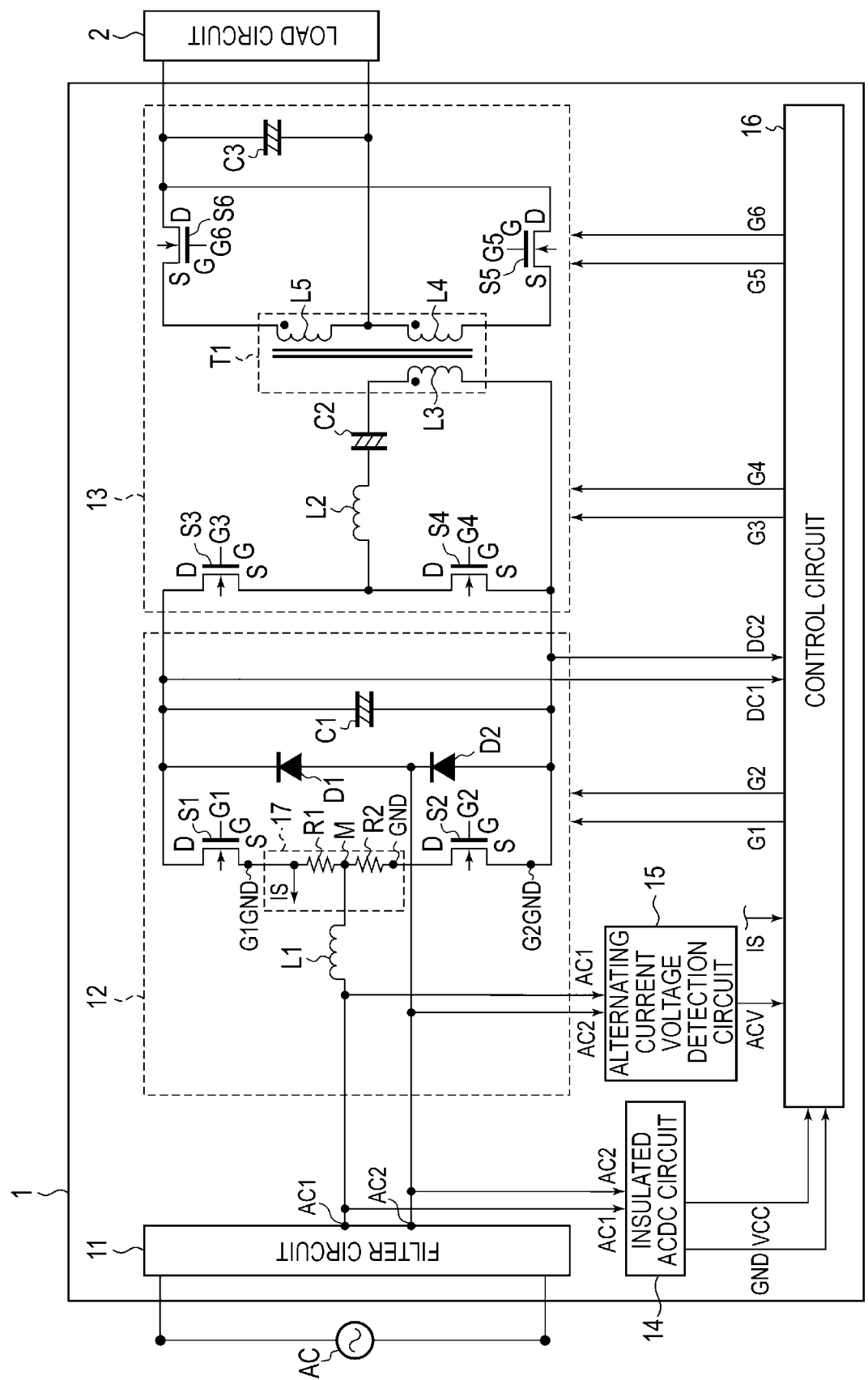
FIG. 1 is a diagram for illustrating an example of a configuration of a power converting device according to an embodiment.

FIG. 1 is a diagram showing an example of a configuration of a power converting device 1 according to an embodiment. The power converting device 1 includes a totem pole type power factor improving circuit and an insulating converter. The power converting device 1 including the totem pole type power factor improving circuit is connected to an AC power supply AC as an input power supply. The totem pole type power factor improving circuit converts an AC voltage of the AC power supply AC (for example, 100 V) into a DC voltage of a high voltage (for example, 400 V). The insulating converter is a so-called DC-DC converter that switches DC voltage from the totem pole type power factor improving circuit at a high frequency to convert into a DC low voltage (for example, about 24 V). The power converting device 1 outputs DC power converted by the insulating converter to a load circuit 2, thereby operating the load circuit 2.

First, a configuration of the power converting device 1 will be described. The power converting device 1 includes a filter circuit 11, a totem pole type power factor improving circuit (totem pole PFC) 12, an LLC resonance circuit 13, an insulated ACDC circuit 14, an AC voltage detection circuit 14, and a control circuit 16.

The filter circuit 11 is a circuit for removing noise leaking from the power converting device 1 to the AC power supply AC. The filter circuit 11 is, for example, an EMC filter. The filter circuit 11 inputs an AC voltage of a commercial frequency 50 Hz component from an input terminal and outputs the same from an output terminal. The filter circuit 11 blocks high-frequency noise generated by the power converting device transmitted to the output terminal, and thus the high-frequency noise is not transmitted to the input terminal. Also, the filter circuit 11 includes a first terminal AC1 and a second terminal AC2 as output terminals. That is, AC power is output from the first terminal AC1 and the second terminal AC2. Also, the first terminal AC1 and the second terminal AC2 of the filter circuit 11 are each connected to the insulated ACDC circuit 14.

The totem pole PFC 12 converts the AC voltage that can be obtained from the AC power supply AC via the filter circuit 11 into a boosted DC voltage and supplies the boosted DC voltage to the LLC resonance circuit 13. The totem pole PFC 12 boosts the AC voltage to a DC voltage higher than the peak value of the AC voltage. Accordingly, the totem pole PFC 12 can control the AC current to become a sine wave. For example, the totem pole PFC 12 boosts the AC voltage to a DC voltage of 400 [V]. As a result, the totem pole PFC 12 can control a current even when the AC voltage is between 90 and 256 [V]. That is, the totem pole PFC 12 can configure a power converter that can be commonly used worldwide.

The totem pole PFC 12 includes a first coil L1, a first half-wave switch S1, a second half-wave switch S2, a first diode D1, a second diode D2, a first smoothing capacitor C1, a first resistance R1, and a second resistance R2.

The first coil L1 is connected to the first terminal of the AC power supply AC via the filter circuit 11. For example, the first coil L1 is connected to the first terminal AC1 of the filter circuit 11.

The first half-wave switch S1 and the second half-wave switch S2 are switch elements that are turned on or off under the control of the control circuit 16. The first half-wave switch S1 and the second half-wave switch S2 are configured by, for example, a wide bandgap semiconductor, such as SiC, GaN, gallium oxide, or diamond. An element configured of such a semiconductor has a higher switching speed than a MOSFET configured of silicon and has a smaller switching loss because stray capacitance between a drain and a source is small.

The first half-wave switch S1 is turned on or off by a gate signal G1 supplied from the control circuit 16. The second half-wave switch S2 is turned on or off by a gate signal G2 supplied from the control circuit 16.

In the first half-wave switch S1, a source terminal is connected to the first coil L1 via the first resistance R1. In the second half-wave switch S2, a drain terminal is connected to the first coil L1 via the second resistance R2. That is, the first resistance R1 and the second resistance R2 are connected in series between the source terminal of the first half-wave switch S1 and the drain terminal of the second half-wave switch S2. That is, in the second half-wave switch S2, the drain terminal is connected to the source terminal of the first half-wave switch S1 via the series connection of the first resistance R1 and the second resistance R2.

Resistance values of the first resistance R1 and the second resistance R2 are, for example, minimum values of about 0.01Ω. The connection point between the first resistance R1 and the second resistance R2 is referred to as a connection point M. The connection point M is connected to the first coil L1. Also, the connection point between the second resistance R2 and the drain terminal of the second half-wave switch S2 is referred to as a reference point GND. A potential of the reference point GND will be described as a reference potential (potential 0 [V]) of various signals in controls described below.

A connection point between the first resistance R1 and the source terminal of the first half-wave switch S1 is connected to the control circuit 16. A signal IS is supplied to the control circuit 16 from the connection point between the first resistance R1 and the source terminal of the first half-wave switch S1. The signal IS is a signal generated at both ends of a series combined resistance of the first resistance R1 and the second resistance R2. That is, the signal IS is a signal indicating the potential of the connection point between the first resistance R1 and the source terminal of the first half-wave switch S1, based on the connection point GND between the second resistance R2 and the drain terminal of the second half-wave switch S2. That is, the signal IS indicates a total value of a result of detecting the DC voltage applied to the first resistance R1 and a result of detecting the DC voltage applied to the second resistance R2. That is, the control circuit 16 obtains, as the signal IS, the potential of the connection point between the first resistance R1 and the source terminal of the first half-wave switch S1 with respect to GND, by setting the potential of the connection point between the second resistance R2 and the drain terminal of the second half-wave switch S2 as GND.

When a current flows towards GND from the connection point M, the potential of the connection point M becomes a positive value with respect to GND. In this case, a potential difference between the connection point M and the source terminal of the first half-wave switch S1 becomes zero. That is, the voltage of the signal IS=the voltage of the connection point M, and thus the signal IS becomes a positive value with respect to GND.

When a current flows towards the connection point M from the source terminal of the first half-wave switch S1, the signal IS becomes a positive voltage with respect to the connection point M. In this case, a potential difference between the connection point M and GND becomes zero. That is, the voltage of the connection point M=the voltage of GND, and thus the signal IS becomes a positive value with respect to GND.

When a current flows towards the source terminal of the first half-wave switch S1 from the connection point M via the first resistance R1, the potential of the connection point M becomes a negative value with respect to the source terminal of the first half-wave switch S1. In this case, the potential difference between the connection point M and GND becomes zero. The signal IS becomes a negative value with respect to GND.

When a current flows towards the connection point M from GND, the potential of the connection point M becomes a negative value with respect to GND. In this case, the potential difference between the connection point M and the source terminal of the first half-wave switch S1 becomes zero. That is, the voltage of the signal IS=the voltage of the connection point M, and thus the signal IS becomes a negative value with respect to GND.

According to such a configuration, the first resistance R1 and the second resistance R2 constitute a current detection circuit 17 supplying to the control circuit 16 the signal IS indicating a value of the current flowing through the first coil L1. The first resistance R1 functions as a first current detector (or a first voltage detector). Also, the second resistance R2 functions as a second current detector (or a second voltage detector).

In the first diode D1, a cathode is connected to the drain terminal of the first half-wave switch S1 and an anode is connected to the second terminal of the AC power supply AC via the filter circuit 11. In the second diode D2, an anode is connected to the source terminal of the second half-wave switch and a cathode is connected to the anode of the first diode D1. The connection point between the anode of the first diode D1 and the cathode of the second diode D2 is connected to the second terminal AC2 of the filter circuit 11.

The first smoothing capacitor C1 is connected between the cathode of the first diode D1 and the anode of the second diode D2. A positive electrode terminal of the first smoothing capacitor C1 and a negative electrode terminal of the first smoothing capacitor C1 constitute an output terminal of a high voltage DC output of the totem pole PFC 12. The positive electrode terminal and negative electrode terminal of the first smoothing capacitor C1 are each connected to the control circuit 16. Accordingly, a signal DC1 corresponding to a potential of the positive electrode terminal of the first smoothing capacitor C1 is supplied to the control circuit 16. Also, a signal DC2 corresponding to a potential of the negative electrode terminal of the first smoothing capacitor C1 is supplied to the control circuit 16.

The LLC resonance circuit 13 is a DCDC conversion circuit that supplies a DC voltage required for the load circuit 2 from a high-voltage DC voltage supplied from the totem pole PFC 12. The LLC resonance circuit 13 includes a switching element S3, a switching element S4, a switching element S5, a switching element S6, the second coil L2, a first winding L3, a second winding L4, a third winding L5, a second smoothing capacitor C2, and a third smoothing capacitor C3.

The switching element S3, the switching element S4, the switching element S5, and the switching element S6 are switch elements that are turned on or off under the control of the control circuit 16. The switching element S3, the switching element S4, the switching element S5, and the switching element S6 are, for example, silicon MOSFETs. The LLC resonance circuit 13 uses a resonance phenomenon, and thus a high-frequency operation can be performed without using a high-speed element in a circuit operation. Accordingly, unlike the totem pole PFC 12, the silicon MOSFET can be used.

The switching element S3 is turned on or off by a gate signal G3 supplied from the control circuit 16. The switching element S4 is turned on or off by a gate signal G4 supplied from the control circuit 16. The switching element S5 is turned on or off by a gate signal G5 supplied from the control circuit 16. The switching element S6 is turned on or off by a gate signal G6 supplied from the control circuit 16.

The drain terminal of the switching element S3 is connected to one output terminal of the totem pole PFC 12 (the positive electrode terminal of the first smoothing capacitor C1). A source terminal of the switching element S4 is connected to the other output terminal of the totem pole PFC 12 (the negative electrode terminal of the first smoothing capacitor C1) and a drain terminal thereof is connected to the source terminal of the switching element S3. Also, the second coil L2, the second smoothing capacitor C2, and the first winding L3 are connected in series between the source terminal of the switching element S4 and a connection point between the switching element S3 and the switching element S4.

The first winding L3, the second winding L4, and the third winding L5 configure an insulating transformer T1. The second winding L4 and the third winding L5 are insulated from the first winding L3 and excited by a magnetic field generated in the first winding L3. The second winding L4 and the third winding L5 are connected to each other. The insulation transformer T1 is configured such that a ratio of the numbers of windings (T: number of turns) (winding number ratio) between the first winding L3 and the second winding L4 is the same as a winding number ratio between the first winding L3 and the third winding L5. Also, the insulation transformer T1 determines a winding number ratio L3:L4 between the first winding L3 and the second winding L4 and a winding number ratio L3:L5 between the first winding L3 and the third winding L5 depending on whether the LLC resonance circuit 13 is a circuit that boosts a voltage or a circuit that lowers a voltage. For example, when the LLC resonance circuit 13 is configured as the circuit that lowers a voltage, a winding number ratio is determined so that in the winding number ratio L3:L4 and the winding number ratio L3:L5, the numbers of windings of the second winding L4 and third winding L5 on the secondary side are smaller than the first winding L3 on the primary side, such as 20T:5T.

According to such a configuration, an alternating current flows through the second coil L2 as the switching element S3 and the switching element S4 are turned on or off. Also, an alternating current equivalent to that of the second coil L2 flows through the first winding L3 of the insulation transformer T1. Accordingly, a magnetic field that changes according to the alternating current is generated in the insulation transformer T1. An induced voltage is generated in the second winding L4 and the third winding L5 by a change in the magnetic field (change in magnetic flux) generated in the insulation transformer T1. According to the induced voltage, the alternating current flows in the second winding L4 and the third winding L5. Specifically, a positive half-wave portion of the alternating current flows through the second winding L4, and a negative half-wave portion of the alternating current flows through the third winding L5. That is, half-wave antiphase currents flow through the second winding L4 and the third winding L5, respectively. The half-wave antiphase currents are rectified by the switching element S5 and the switching element S6 for synchronous rectification and are charged in the third smoothing capacitor C3 as a positive current.

The source terminal of the switching element S5 is connected to the second winding L4 and the drain terminal thereof is connected to the positive electrode terminal of the third smoothing capacitor C3. The source terminal of the switching element S6 is connected to the third winding L5 and the drain terminal thereof is connected to the positive electrode terminal of the third smoothing capacitor C3. The negative electrode terminal of the third smoothing capacitor C3 is connected to the connection point between the second winding L4 and the third winding L5. The load circuit 2 is connected to the third smoothing capacitor C3 in parallel.

According to such a configuration, the switching element S5 functions as a body diode flowing a current from the second winding L4 to the positive electrode terminal of the third smoothing capacitor C3. Also, the switching element S6 functions as a body diode flowing a current from the third winding L5 to the positive electrode terminal of the third smoothing capacitor C3.

According to such a configuration, the current flows through the body diodes of the switching element S5 and switching element S6 even if the switching element S5 and the switching element S6 are in off states. As a result, the current flows through the second winding L4 and the third winding L5 at a timing when the alternating current flows through the first winding L3. The current that passed through the body diodes of the switching element S5 and switching element S6 is charged in the third smoothing capacitor C3. Accordingly, DC power is supplied to the load circuit 2 connected to the third smoothing capacitor C3.

In this example, the current flows through the body diodes of the switching element S5 and switching element S6, and thus there is a forward voltage difference of about 1 [V]. For example, if a current of 10 [A] flows, loss=forward voltage× current=10 [W].

On the other hand, if on-resistance, when the switching element S5 and the switching element S6 are each conducting, is 0.01 [Ω], loss=square of the current×resistance=10× 10×0.01=1 W. Therefore, the control circuit 16 may be configured to turn on the switching element S5 and the switching element S6 according to the gate signals G5 and G6 at a timing when the current flows through the body diode of each of the switching element S5 and the switching element S6. As a result, it is possible to reduce a conduction loss and configure a power converter with good efficiency.

The insulated ACDC circuit 14 generates a DC voltage VCC insulated from the AC power supply AC, based on an AC voltage of the AC power supply AC. The DC voltage VCC is a minute (several watts) power supply for operating the control circuit 16. The insulated ACDC circuit 14 is connected to the first terminal AC1 and second terminal AC2 of the filter circuit 11. The insulated ACDC circuit 14 receives a part of the AC voltage supplied from the first terminal AC1 and second terminal AC2 of the filter circuit 11 and uses a voltage required for the operation of the control circuit 16 to generate the DC voltage VCC.

The AC voltage detection circuit 15 detects the AC voltage of the AC power supply AC and supplies a detection result to the control circuit 16. The AC voltage detection circuit 15 is connected to the first terminal AC1 and second terminal AC2 of the filter circuit 11. That is, the AC voltage detection circuit 15 detects a signal ACV (alternating current voltage) indicating the voltage of the AC power supply AC, based on the potential of the first terminal AC1 of the filter circuit 11 and the potential of the second terminal AC2 of the filter circuit 11, and supplies the signal ACV to the control circuit 16. The AC voltage detection circuit 15 may be configured to supply the signal ACV as an analog value to the control circuit 16 or configured to supply the signal ACV of a digital value to the control circuit 16. Hereinafter, the potential of the first terminal AC1 of the filter circuit 11 is simply referred to as AC1 and the potential of the second terminal AC2 of the filter circuit 11 is simply referred to as AC2.

The control circuit 16 controls switching elements of the totem pole PFC 12 and LLC resonance circuit 13. The control circuit 16 is configured by, for example, an arithmetic IC, such as a microcomputer or a digital signal processor. The control circuit 16 receives the DC voltage VCC for operation from the insulated ACDC circuit 14. Also, the control circuit 16 receives the signal ACV from the AC voltage detection circuit 15. The control circuit 16 receives the signal IS from the current detection circuit 17. As described above, the signal IS is a signal indicating the potential of the connection point between the first resistance R1 and the source terminal of the first half-wave switch S1 with reference to the connection point GND between the second resistance R2 and the drain terminal of the second half-wave switch S2. The control circuit 16 receives the signal DC1 and the signal DC2 from an output terminal of the totem pole PFC 12.

The control circuit 16 generates the gate signal G1 and the gate signal G2 for turning on or off the first half-wave switch S1 and the second half-wave switch S2, based on the signal ACV, the signal IS, the signal DC1, and the signal DC2, and inputs the gate signal G1 and the gate signal G2 to the totem pole PFC 12. Accordingly, the control circuit 16 controls pulse widths of the gate signal G1 and gate signal G2 such that the current flowing through the first coil L1 becomes a sine wave having the same phase as the phase of the input AC voltage.

Also, the control circuit 16 generates the gate signals G3 to G6 for turning on or off the switching element S3, the switching element S4, the switching element S5, and the switching element S6, based on the output voltage of the LLC resonance circuit 13, and inputs the gate signals G3 to G6 to the LLC resonance circuit 13.

Next, the operation of the totem pole PFC 12 will be described.

As described above, the totem pole PFC 12 operates based on the gate signal G1 and the gate signal G2 from the control circuit 16. For example, the totem pole PFC 12 operates while switching among four states shown in FIG. 2.

Figure 2:
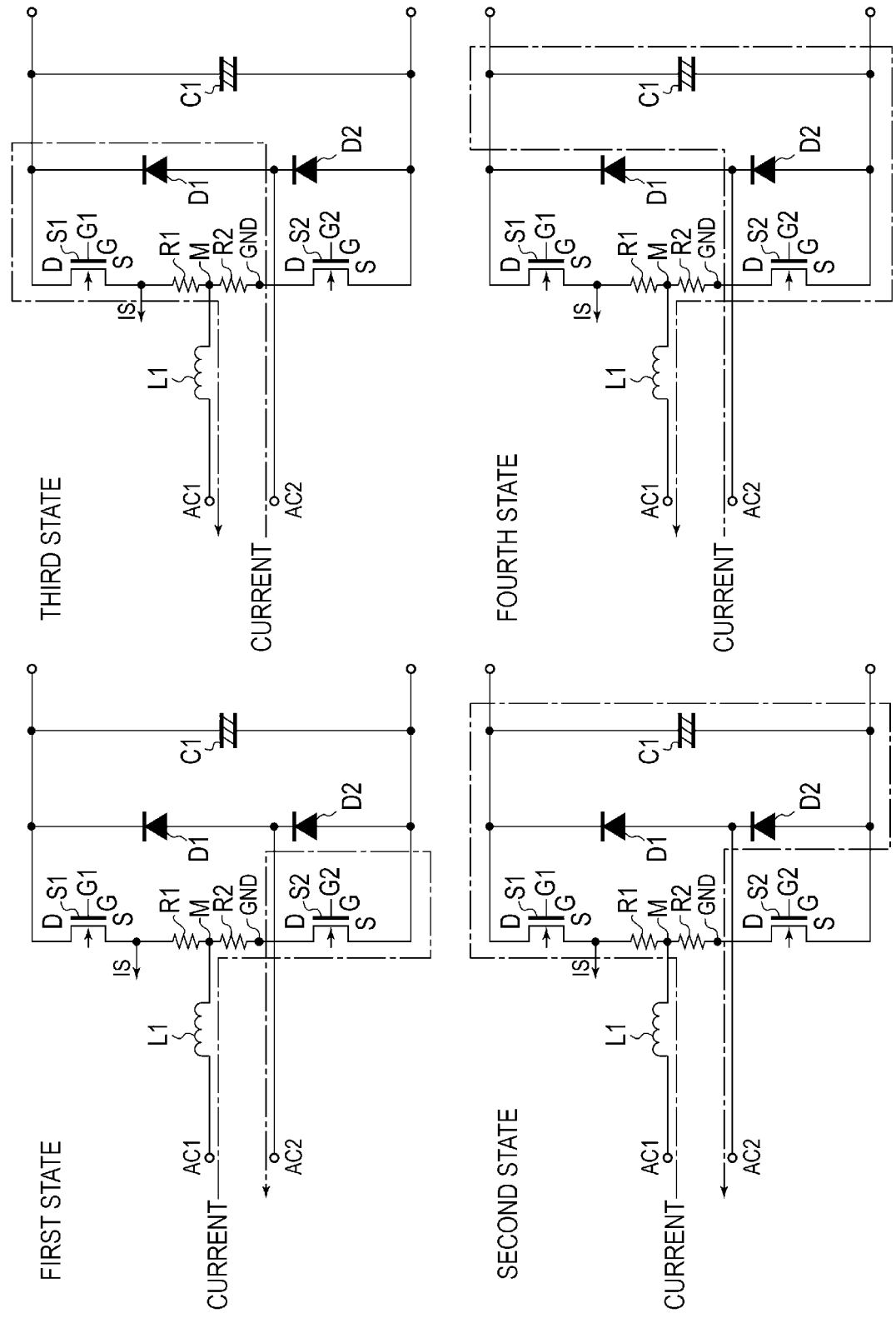
FIG. 2 is a diagram for illustrating an example of the operation of a totem pole PFC, according to an embodiment.

A first state is a state in which AC1>AC2 (AC1 is positive with respect to AC2), and the first half-wave switch S1 is turned off by the gate signal G1 (the gate signal G1 is turned off) while the second half-wave switch S2 is turned on by the gate signal G2 (the gate signal G2 is turned on). In this case, as shown in FIG. 2, a current flows in the order of the first terminal AC1, the first coil L1, the second resistance R2, the second half-wave switch S2, the second diode D2, the first resistance R1, and the second terminal AC2. At this time, the voltage of the first resistance R1 is 0 and the voltage of the second resistance R2 is positive. That is, the potential of the second resistance R2 is positive with respect to the reference point GND. Also, the potential of the first resistance R1 can be considered to be almost the same as the potential of the second resistance R2, and thus is positive with respect to the reference point GND. In this case, the signal IS is positive.

A second state is a state in which AC1>AC2 (AC1 is positive with respect to AC2), and the first half-wave switch S1 is turned off by the gate signal G1 (the gate signal G1 is turned off) and the second half-wave switch S2 is turned off by the gate signal G2 (the gate signal G2 is turned off). In this case, the first half-wave switch S1 functions as a body diode from the source terminal towards the drain terminal. Accordingly, as shown in FIG. 2, a current flows in the order of the first terminal AC1, the first coil L1, the first resistance R1, the first half-wave switch S1, the first smoothing capacitor C1, the second diode D2, and the second terminal AC2. At this time, the voltage of the second resistance R2 is 0 and the voltage of the first resistance R1 is negative. That is, the potential of the first resistance R1 is negative with respect to the reference point GND. In this case, the signal IS is negative.

The totem pole PFC 12 maintains the first half-wave switch S1 in an off state while AC1>AC2 (AC1 is positive with respect to AC2), and repeatedly turns on and off the second half-wave switch S2 at a high frequency, according to the gate signal G2. Accordingly, the totem pole PFC 12 repeatedly switches between the first state and the second state while AC1>AC2 (AC1 is positive with respect to AC2).

A third state is a state in which AC1<AC2 (AC1 is negative with respect to AC2), and the first half-wave switch S1 is turned on by the gate signal G1 (the gate signal G1 is turned on) while the second half-wave switch S2 is turned off by the gate signal G2 (the gate signal G2 is turned off). In this case, as shown in FIG. 2, a current flows in the order of the second terminal AC2, the first diode D1, the first half-wave switch S1, the first resistance R1, the first coil L1, and the first terminal AC1. At this time, the voltage of the second resistance R2 is 0 and the voltage of the first resistance R1 is positive. That is, the potential of the first resistance R1 is positive with respect to the reference point GND. In this case, the signal IS is positive.

A fourth state is a state in which AC1<AC2 (AC1 is negative with respect to AC2), and the first half-wave switch S1 is turned off by the gate signal G1 (the gate signal G1 is turned off) and the second half-wave switch S2 is turned off by the gate signal G2 (the gate signal G2 is turned off). In this case, the second half-wave switch S2 functions as a body diode from the source terminal towards the drain terminal. Accordingly, as shown in FIG. 2, a current flows in the order of the second terminal AC2, the first diode D1, the first smoothing capacitor C1, the second half-wave switch S2, the second resistance R2, the first coil L1, and the first terminal AC1. At this time, the voltage of the first resistance R1 is 0 and the voltage of the second resistance R2 is negative. That is, the potential of the second resistance R2 is negative with respect to the reference point GND. In this case, the signal IS is negative.

The totem pole PFC 12 maintains the second half-wave switch S2 in an off state while AC1<AC2 (AC1 is negative with respect to AC2), and repeatedly turns on and off the first half-wave switch S1 at a high frequency, according to the gate signal G1. Accordingly, the totem pole PFC 12 repeatedly switches between the third state and the fourth state while AC1<AC2 (AC1 is negative with respect to AC2).

The control circuit 16 turns on or off the second half-wave switch S2 when AC1>AC2 (AC1 is positive with respect to AC2). Accordingly, the control circuit 16 controls the current flowing through the first coil L1 to be a sinusoidal current having the same shape as the AC voltage ACV of the AC power supply AC while AC1 is positive with respect to AC2. Also, the control circuit 16 turns on or off the first half-wave switch S1 when AC1<AC2 (AC1 is negative with respect to AC2). Accordingly, the control circuit 16 controls the current flowing through the first coil L1 to be a sinusoidal current having the same shape as the AC voltage ACV of the AC power supply AC while AC1 is negative with respect to AC2. As a result, the generation of current harmonic noise can be suppressed.

Next, an example of a detailed configuration of the control circuit 16 will be described.

Figure 3:
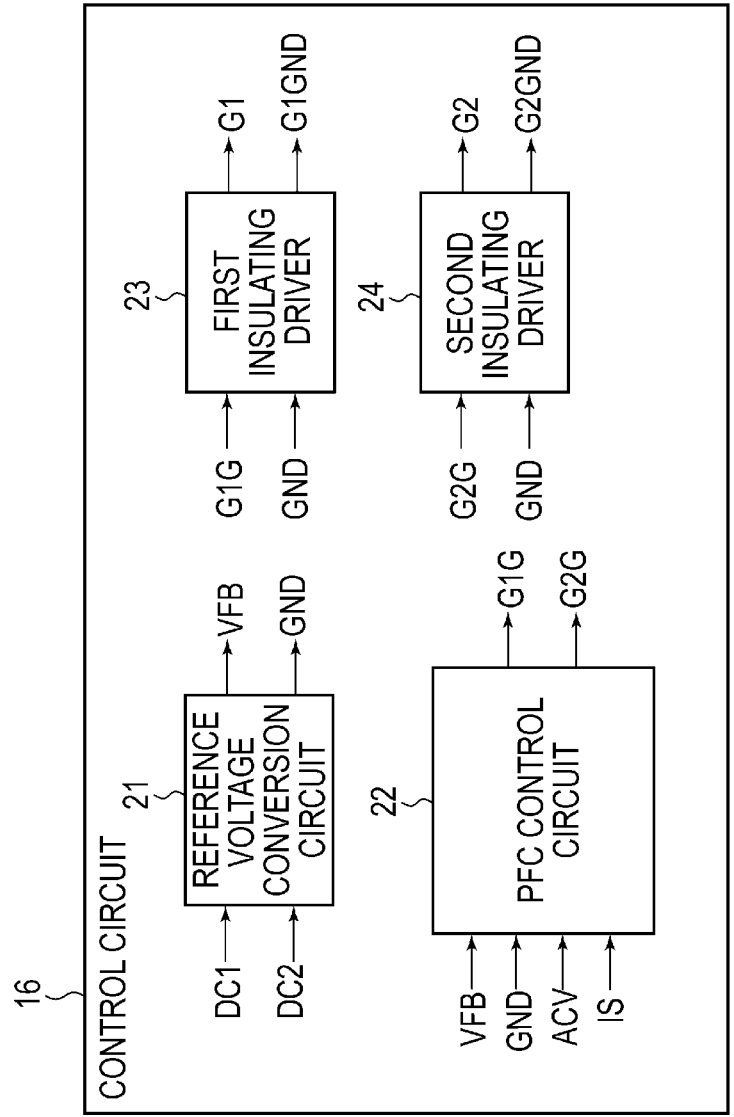
FIG. 3 is a diagram for illustrating an example of a configuration of a control circuit, according to an embodiment.

FIG. 3 is a diagram for illustrating an example of a configuration of the control circuit 16.

The control circuit 16 includes a reference voltage conversion circuit 21, a PFC control circuit 22, a first insulating driver 23, and a second insulating driver 24.

The reference voltage conversion circuit 21 outputs an output voltage of the totem pole PFC 12 and a signal VFB indicating a voltage based on GND. In the totem pole PFC 12, AC2, and DC2 have the same potential while AC1>AC2. Also, in the totem pole PFC 12, AC1 and DC1 have the same potential while AC1<AC2. As such, a reference voltage of an output of the totem pole PFC 12 fluctuates. Thus, the reference voltage conversion circuit 21 converts the signal DC1 and the signal DC2 received from the output terminal of the totem pole PFC 12 into the signal VFB indicating the voltage based on GND.

Figure 4:
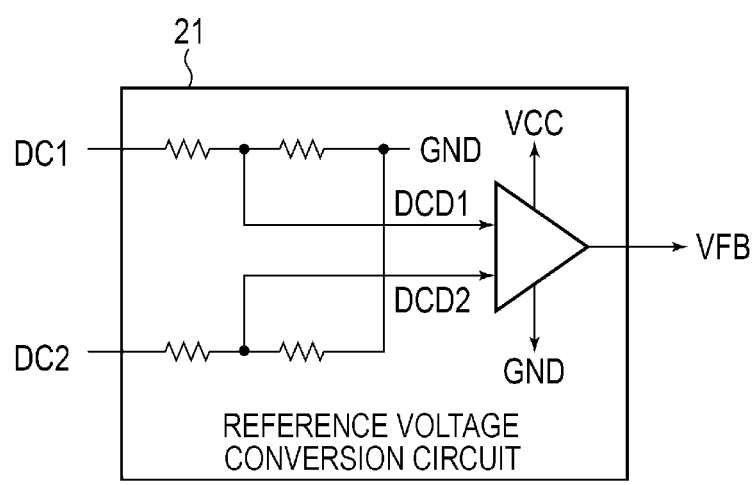
FIG. 4 is a diagram for illustrating an example of a configuration of a reference voltage conversion circuit, according to an embodiment.

FIG. 4 is a diagram for illustrating an example of a configuration of the reference voltage conversion circuit 21. The reference voltage conversion circuit 21 includes a plurality of resistances and an operational amplifier. The reference voltage conversion circuit 21 resist-divides the potential of each of the signal DC1 and signal DC2 based on GND and inputs the divided signals DCD1 and DCD2 to two terminals of the operational amplifier. In this case, the resistance value of the resistance is determined such that the divided voltage value does not exceed the DC voltage VCC. That is, the signal DCD1 and the signal DCD2 appear as potentials between GND and VCC. The operational amplifier outputs a difference between the signal DCD1 and the signal DCD2 as the signal VFB.

The reference voltage conversion circuit 21 may be configured to output the signal VFB by another method. For example, the reference voltage conversion circuit 21 converts the potential difference of the signal DC1 and the signal DC2 into a pulse width and inputs the pulse to a photocoupler or the like. Accordingly, a GND-based pulse conduction current is generated. A voltage corresponding to the pulse width is regenerated based on GND. As a result, the potential difference of another portion of potential may be converted into a GND-based signal.

Figure 5:
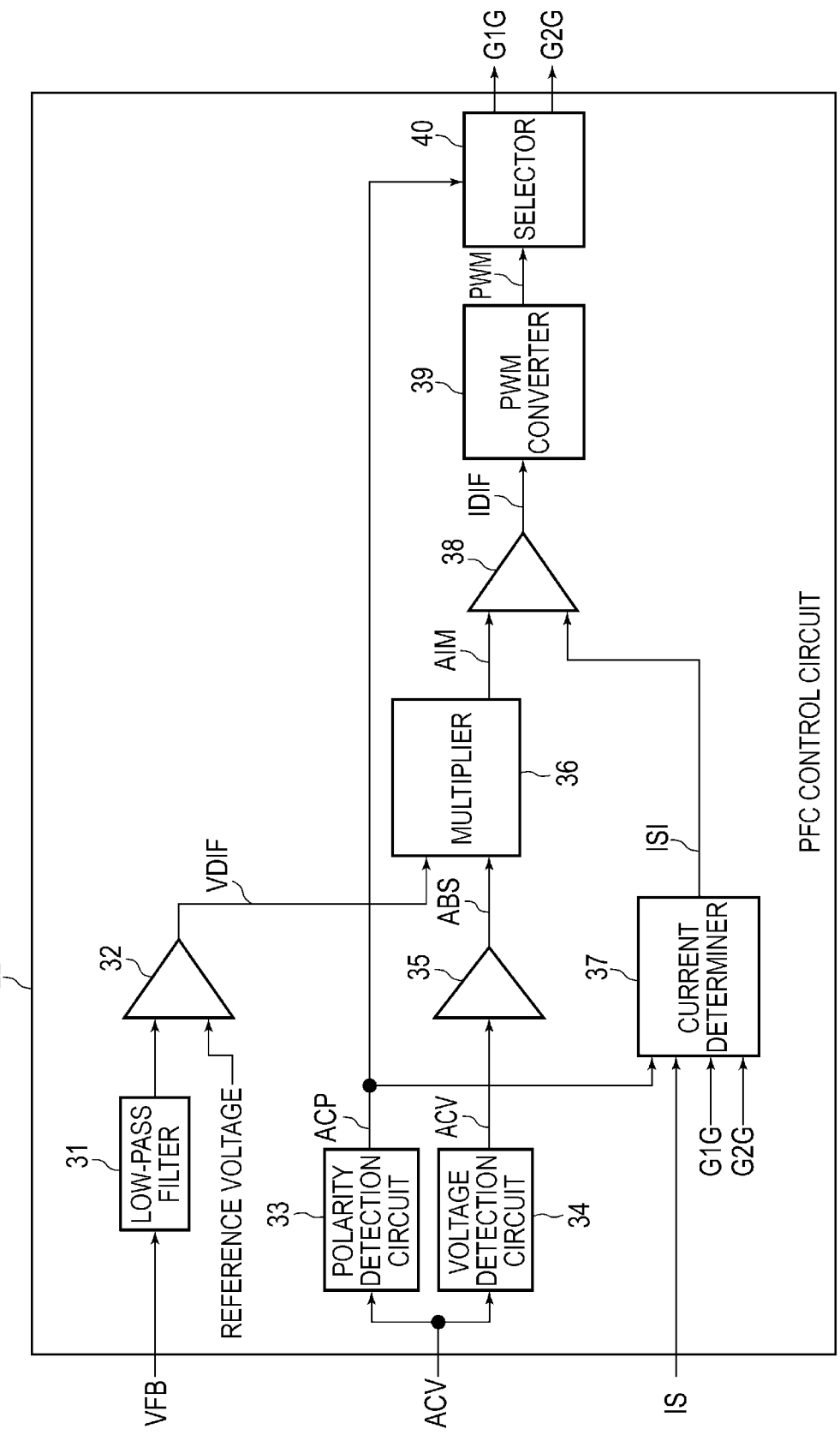
FIG. 5 is a diagram for illustrating an example of a configuration of a control circuit, according to an embodiment.

FIG. 5 is a diagram for illustrating an example of a configuration of the PFC control circuit 22. The PFC control circuit 22 outputs a signal G1G and a signal G2G used to control the first half-wave switch S1 and the second half-wave switch S2 of the totem pole PFC 12, based on the signal VFB, the signal ACV, and the signal IS. The signals G1G and G2G are signals for controlling the first half-wave switch S1 and second half-wave switch S2, based on the potential of the reference point GND.

The PFC control circuit 22 includes a low-pass filter 31, a first comparator 32, a polarity detection circuit 33, a voltage detection circuit 34, an absolute value conversion circuit 35, a multiplier 36, a current determiner 37, a second comparator 38, a PWM converter 39, and a selector 40.

The signal VFB is input to the low-pass filter 31. The low-pass filter 31 cuts a high-frequency component of the input signal VFB and inputs the same to the first comparator 32. The low-pass filter 31 is set to have, for example, a frequency lower than a frequency of 50 Hz of the AC power supply. For example, the low-pass filter 31 is set to transmit a frequency component lower than 20 Hz. That is, the low-pass filter 31 is configured to cut a frequency component higher than 20 Hz. According to such a configuration, the low-pass filter 31 can cancel a 100 Hz (full wave of 50 Hz) component generated in the first smoothing capacitor C1 and output an average value of a voltage of the first smoothing capacitor C1.

An output of the low-pass filter 31 and a reference voltage are input to the first comparator 32. The first comparator 32 outputs, to the multiplier 36, a result of comparing the output of the low-pass filter 31 and the reference voltage. That is, the first comparator 32 outputs a signal VDIF that is a result of comparing a low-frequency component of the signal VFB and the reference voltage. Specifically, the first comparator 32 subtracts the reference voltage from the low-frequency component of the signal VFB and outputs the result thereof as the signal VDIF. That is, the signal VDIF indicates a displacement of the signal VFB with respect to the reference voltage.

Any value is set for the reference voltage. The reference voltage is set to, for example, 400 V. It is possible to support any AC voltage worldwide by setting the reference voltage to 400 V. The highest AC voltage worldwide is 264 V, and thus a peak value thereof is 372 V that is 1.41 times 264 V. By setting a voltage higher than 372 V as the reference voltage, the reference voltage is power conversion that can be used universally.

The polarity detection circuit 33 detects the polarity of an AC voltage supplied from the AC power supply AC, based on the signal ACV, and outputs a result of the detection as a signal ACP. The polarity detection circuit 33 outputs the signal ACP to the current determiner 37 and the selector 40. The polarity detection circuit 33 outputs, as the signal ACP, a logical value of any one of "0" and "1" based on whether the value of the signal ACV is positive or negative. For example, the signal ACV is assumed to have a configuration indicating the potential of the first terminal AC1 with respect to the second terminal AC2 of the filter circuit 11. In this case, the polarity detection circuit 33 outputs the signal ACP of "1" when the signal ACV is positive and outputs the signal ACP of "0" when the signal ACV is negative. That is, the polarity detection circuit 33 outputs the signal ACP of "1" when the potential of the first terminal AC1>the potential of the second terminal AC2, and outputs the signal ACP of "0" when the potential of the first terminal AC1<the potential of the second terminal AC2.

The voltage detection circuit 34 converts the signal ACV into a signal of a voltage having any width and outputs the same to the absolute value conversion circuit 35. The signal ACV input to the voltage detection circuit 34 has an instantaneous value of −141 to 141 V when the AC power supply AC is an AC power supply having an effective value of 100 V. The voltage detection circuit 34 converts the instantaneous value of the AC voltage of the AC power supply AC, indicated by the signal ACV, into a value within a pre-set range. That is, the voltage detection circuit 34 normalizes the instantaneous value of the AC voltage of the AC power supply AC, indicated by the signal ACV. Specifically, the voltage detection circuit 34 converts the instantaneous value of the AC voltage of the AC power supply AC, indicated by the signal ACV, into an instantaneous value in a range of −1 to 1. It becomes possible to determine a phase in a waveform of a sine wave state, based on the signal ACV converted by the voltage detection circuit 34. That is, the signal ACV normalized by the voltage detection circuit 34 can be rephrased as sine wave phase information indicating a phase in a sine wave.

The absolute value conversion circuit 35 converts the signal ACV output from the voltage detection circuit 34 into a signal ABS that is a signal of an absolute value, and outputs the signal ABS to the multiplier 36. The absolute value conversion circuit 35 converts the signal ACV output from the voltage detection circuit 34 into a signal of a value of 0 to 1 (a signal in a full-wave rectified state) by converting the signal ACV into an absolute value.

The multiplier 36 multiplies the signal VDIF supplied from the first comparator 32 and the signal ABS supplied from the absolute value conversion circuit 35. The multiplier 36 outputs, as a signal AIM, the result of multiplying the signal VDIF and the signal ABS to the second comparator 38. The signal AIM indicates a target current value.

The signal ACP, the signal IS, the signal G1G, and the signal G2G are input to the current determiner 37. The current determiner 37 detects the signal IS when the signal G1G or the signal G2G is emitting a pulse. Specifically, the current determiner 37 obtains an extraction signal ISE by performing an extraction process to extract a signal from the input signal IS while the signal G1G is on or the signal G2G is on. The extraction signal ISE is a value of the signal IS when the signal G1G is on or when the signal G2G is on. That is, the extraction signal ISE is a positive value with reference to the GND voltage of the signal IS. Accordingly, the extraction signal ISE has a discrete waveform. That is, there is timing when there is no value in the extraction signal ISE.

The current determiner 37 obtains an interpolation signal ISI having a continuous waveform by performing interpolation based on the extraction signal ISE. That is, the current determiner 37 calculates the interpolation signal ISI by interpolating the timing when there is no value of the extraction signal ISE. That is, the current determiner 37 calculates a value of the timing when there is no value in the extraction signal ISE by performing linear interpolation or any mathematical approximation based on the values of the past extraction signals ISE. As a result, the interpolation signal ISI becomes a signal that approximately indicates a current actually flowing through the first coil L1. The current determiner 37 outputs the interpolation signal ISI to the second comparator 38.

The signal AIM and the interpolation signal ISI are input to the second comparator 38. The second comparator 38 outputs a signal IDIF that is a result of comparing the signal AIM and the interpolation signal ISI to the PWM converter 39. The signal IDIF indicates the difference between the signal AIM that is a target current value and the interpolation signal ISI approximated to a current that is actually flowing.

The PWM converter 39 generates a signal PWM that is a pulse width modulated signal, based on a value of the signal IDIF and outputs the signal PWM to the selector 40. For example, when a current actually flowing is small with respect to the target current value, the PWM converter 39 performs modulation of increasing the pulse width, and when the current actually flowing is large with respect to the target current value, the PWM converter 39 performs modulation of decreasing the pulse width.

The signal ACP and the signal PWM are input to the selector 40. The selector 40 determines, based on the signal ACP, whether to output the signal PWM as the signal G1G to the first insulating driver 23 and the current determiner 37 or output the signal PWM as the signal G2G to the second insulating driver 24 and the current determiner 37. Specifically, when the signal ACP is "1", the selector 40 outputs the signal PWM as the signal G2G to the second insulating driver 24 and the current determiner 37. Alternatively, when the signal ACP is "0", the selector 40 outputs the signal PWM as the signal G1G to the first insulating driver 23 and the current determiner 37. The signal PWM, i.e., the signal G1G and the signal G2G, is a GND-based signal. Of the first insulating driver 23 and the second insulating driver 24, a signal supplied to one to which the signal PWM is not output becomes "0 (stop signal)".

The first insulating driver 23 and the second insulating driver 24 insulate a signal input to a primary side and outputs the same from a secondary side.

FIG. 6 is a diagram for illustrating an example of configurations of the first insulating driver 23 and the second insulating driver 24. The first insulating driver 23 and the second insulating driver 24 each include, for example, a pulse transformer 41. The pulse transformer 41 includes a winding on the primary side, a winding on the secondary side, and a magnetic core.

As shown in FIG. 6, GND-based G1G and GND are connected to the winding on the primary side of the pulse transformer 41 of the first insulating driver 23, and G1GND-based G1 is connected to the winding on the secondary side of the pulse transformer 41. Specifically, GND and the selector 40 of the totem pole PFC 12 are connected to the winding on the primary side of the pulse transformer 41. Also, the gate terminal of the first half-wave switch S1 and the source terminal of the first half-wave switch S1 are connected to the winding on the secondary side of the pulse transformer 41.

According to the above configuration, the signal G1G that is a GND-based pulse form signal output from the totem pole PFC 12 is input to the winding on the primary side of the pulse transformer 41 of the first insulating driver 23. When the GND-based signal G1G is input to the winding on the primary side of the pulse transformer 41, an induced voltage is generated in the winding on the secondary side of the pulse transformer 41. According to the induced voltage, the signal G1 that is a pulse form signal corresponding to the signal G1G and based on potential G1GND of the source terminal of the first half-wave switch S1 is input from the winding on the secondary side of the pulse transformer 41 to the gate terminal of the first half-wave switch S1. As a result, the first half-wave switch S1 is turned on or off based on the signal G1.

As shown in FIG. 6, GND-based G2G and GND are connected to the winding on the primary side of the pulse transformer 41 of the second insulating driver 24, and G2GND-based G2 is connected to the winding on the secondary side of the pulse transformer 41. Specifically, the selector 40 of the totem pole PFC 12 and GND are connected to the winding on the primary side of the pulse transformer 41. Also, the gate terminal of the second half-wave switch S2 and the source terminal of the second half-wave switch S2 are connected to the winding on the secondary side of the pulse transformer 41.

According to the above configuration, the signal G2G that is a GND-based pulse form signal output from the totem pole PFC 12 is input to the winding on the primary side of the pulse transformer 41 of the second insulating driver 24. When the GND-based signal G2G is input to the winding on the primary side of the pulse transformer 41, an induced voltage is generated in the winding on the secondary side of the pulse transformer 41. According to the induced voltage, the signal G2, which is a pulse form signal corresponding to the signal G2G and based on potential G2GND of the source terminal of the second half-wave switch S2, is input from the winding on the secondary side of the pulse transformer 41 to the gate terminal of the second half-wave switch S2.

The first insulating driver 23 and the second insulating driver 24 may further include a filter capacitor that is connected to the winding on the primary side of the pulse transformer 41 in series and cuts a DC component.

The signal G1 and the signal G2 are positive and negative signals based on G1GND and G2GND, respectively. Accordingly, a winding number ratio of the coil of the pulse transformer 41 may be adjusted such that values of the signal G1 and signal G2 are doubled (such that the voltage is the same as that of the primary side).

Also, the first insulating driver 23 and the second insulating driver 24 may further include a filter capacitor that is connected to the coil on the secondary side of the pulse transformer 41 in series and cuts a DC component.

The first insulating driver 23 and the second insulating driver 24 may be configured to convert the signals G1G and G2G into G1GND and G2GND-based signals G1 and G2 by a photocoupler. Since a signal output from the photocoupler is weak, a buffer circuit may be further provided.

The first insulating driver 23 and the second insulating driver 24 may boost a signal output from the photocoupler by a DC power supply for boost by a bootstrap method, and input the same to the gate terminal of the second half-wave switch S2. For example, when the signal G2 is on, the potential of G1GND is the same as the potential of G2GND. When the DC power supply for boost is connected to the G2GND side, the potential of the DC power supply for boost is also supplied to G1GND through the body diode of the second half-wave switch S2. Then, when the signal G2 is off, the potential of G1GND is different from the potential of G2GND, but G1GND-based potential is preserved. The signal output from the photocoupler may be amplified by using this potential and input to the gate terminal of the first half-wave switch S1.

Figure 7:
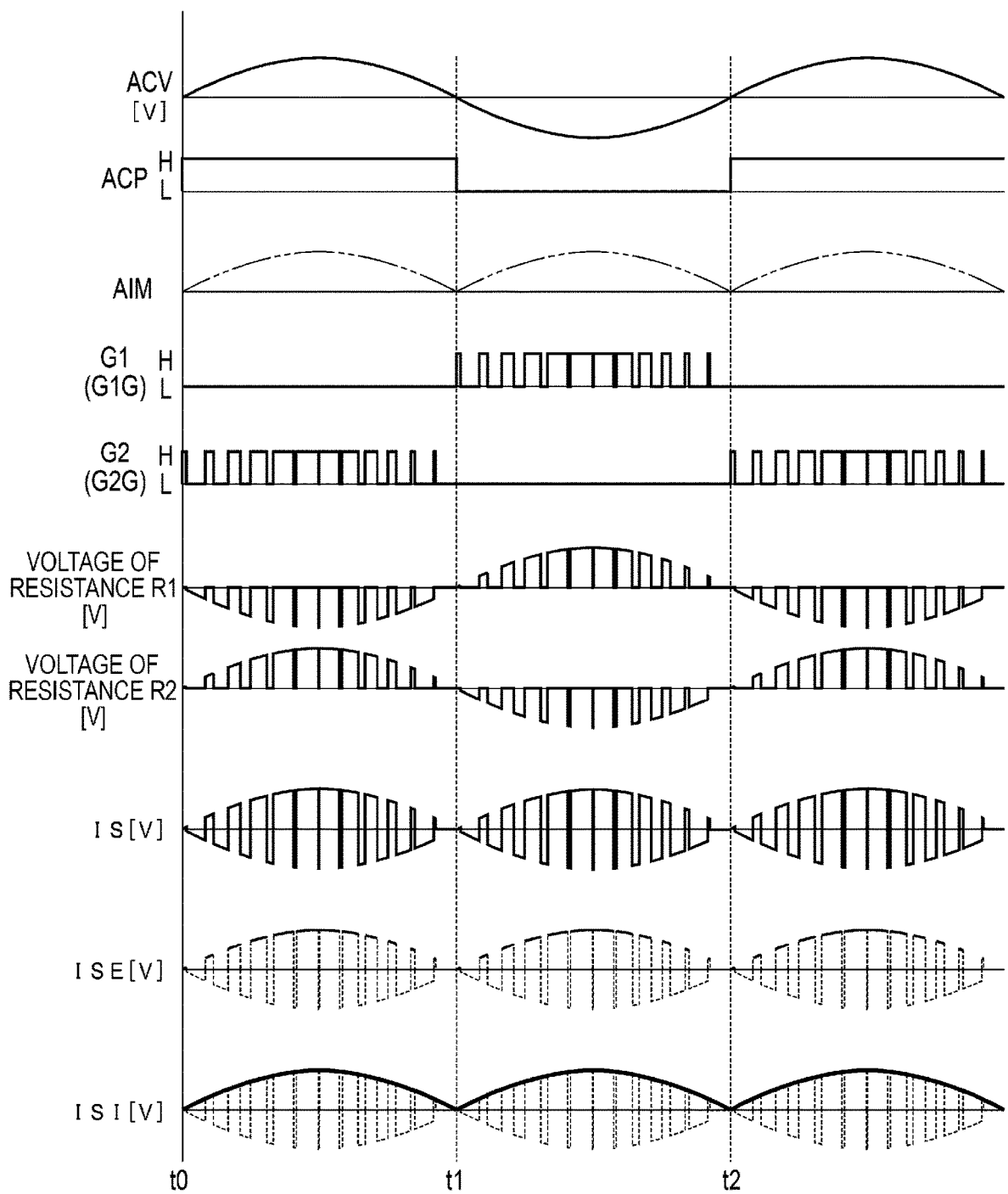
FIG. 7 is a diagram for illustrating the control of a totem pole PFC, according to an embodiment.

FIG. 7 is a diagram for illustrating a relationship between the voltage of the AC power supply AC and the current flowing through the totem pole PFC 12. In FIG. 7, examples of the signal ACV indicating the voltage of the AC power supply AC, the signal ACP indicating the result of polarity detection, the signal G1 (G1G) input to the gate terminal of the first half-wave switch S1, the signal G2 (G2G) input to the gate terminal of the second half-wave switch S2, the voltage applied to the first resistance R1, the voltage applied to the second resistance R2, the signal IS, the extraction signal ISE, and the interpolation signal ISI are illustrated. In the example of FIG. 7, the polarity is positive (AC1>AC2) between a timing t0 and a timing t1, the polarity is negative (AC1<AC2) between the timing t1 and a timing t2, and the polarity is positive again (AC1>AC2) after the timing t2.

As described above, the polarity detection circuit 33 outputs the signal ACP having a logical value "1" while AC1>AC2, and outputs the signal ACP having a logical value "0" while AC1<AC2.

Also, the control circuit 16 of the totem pole PFC 12 sequentially calculates the signal AIM indicating a target current, based on the signal VFB indicating the output voltage of the totem pole PFC 12 and ACV indicating the AC voltage.

The control circuit 16 generates the signal PWM based on the signal IDIF that is the result of comparing the signal AIM and the interpolation signal ISI while AC1>AC2. That is, the control circuit 16 generates the signal PWM such that the difference between the signal AIM and the interpolation signal ISI is small, and inputs the signal PWM as the signal G2 to the gate terminal of the second half-wave switch S2. Accordingly, the totem pole PFC 12 turns on or off the second half-wave switch S2 by the signal G2 while AC1>AC2. As a result, the totem pole PFC 12 switches between the first state and the second state shown in FIG. 2, according to the signal G2.

The totem pole PFC 12 controls lengths of the first state and second state by controlling a pulse width. Specifically, the totem pole PFC 12 controls ON duty of the signal G2 corresponding to the length of the first state in one cycle by frequency fixation. Accordingly, at the same time, the length of the second state is also determined by subtracting the length of the first state from the length of one cycle. As such, the totem pole PFC 12 can switch between the first state and the second state a plurality of times to bring the interpolation signal ISI and the signal AIM that is a target waveform of the interpolation signal ISI close to each other.

Also, the control circuit 16 generates the signal PWM based on the signal IDIF that is a result of comparing the signal AIM and the interpolation signal ISI while AC1<AC2. That is, the control circuit 16 generates the signal PWM such that the difference between the signal AIM and the interpolation signal ISI is small, and inputs the signal PWM as the signal G1 to the gate terminal of the first half-wave switch S1. Accordingly, the totem pole PFC 12 turns on or off the first half-wave switch S1 by the signal G1 while AC1<AC2. As a result, the totem pole PFC 12 switches between the third state and the fourth state shown in FIG. 2, according to the signal G1.

The totem pole PFC 12 controls lengths of the third state and fourth state by controlling the pulse width. Specifically, the totem pole PFC 12 controls ON duty of the signal G1 corresponding to the length of the third state in one cycle by frequency fixation. Accordingly, at the same time, the length of the fourth state is also determined by subtracting the length of the third state from the length of one cycle.

In the first state, the voltage of the first resistance R1 becomes 0 and the voltage of the second resistance R2 becomes a positive value. In the second state, the voltage of the second resistance R2 becomes 0 and the voltage of the first resistance R1 becomes a negative value. In the third state, the voltage of the second resistance R2 becomes 0 and the voltage of the first resistance R1 becomes a positive value. In the fourth state, the voltage of the first resistance R1 becomes 0 and the voltage of the second resistance R2 becomes a negative value. That is, as shown in FIG. 7, positive components of results of detecting the voltage of the first resistance R1 that is a first current detector, and the voltage of the second resistance R2 that is a second current detector become a pulsating voltage having a half-wave shape (a half-wave shaped pulsating voltage). The positive component of the result of detecting the voltage of the first resistance R1, which is the first current detector, and the positive component of the result of detecting the voltage of the second resistance R2, which is the second current detector, have different phases by 180°. Since the signal IS is a signal generated at both ends of a series combined resistance of the first resistance R1 and the second resistance R2, as shown in FIG. 7, the voltage of the first resistance R1 and the voltage of the second resistance R2 are added and combined to form a waveform (a bi-wave shaped pulsating voltage). That is, the signal IS is a signal obtained by adding the result of detecting the voltage of the first resistance R1 that is the first current detector and the result of detecting the voltage of the second resistance R2 that is the second current detector, and has the positive component in a full-wave shaped pulsating voltage.

The extraction signal ISE is the signal IS while the signal G1G is on or the signal G2G is on. While AC1<AC2, the signal G1G is off and the power converting device 1 operates by turning the signal G2G on or off. While AC1<AC2, the current determiner 37 obtains the signal IS while the signal G2G is on, as the extraction signal ISE. While AC1<AC2 and the signal G2G is on, the signal IS has a positive value. Accordingly, the current determiner 37 can extract the positive value of the signal IS as the extraction signal ISE.

Also, while AC1>AC2, the signal G2G is off and the power converting device 1 operates by turning the signal G1G on or off. While AC1>AC2, the current determiner 37 obtains the signal IS while the signal G1G is on, as the extraction signal ISE. While AC1>AC2 and the signal G1G is on, the signal IS has a positive value. Accordingly, the current determiner 37 can extract the positive value of the signal IS as the extraction signal ISE.

The current determiner 37 includes a configuration (circuit) for obtaining (generating) the interpolation signal ISI having a continuous waveform by performing interpolation based on the extraction signal ISE. For example, the current determiner 37 interpolates a blank value in the extraction signal ISE by performing linear interpolation or some mathematical approximation. As a result, the current determiner 37 can output, as the interpolation signal ISI, a signal corresponding to the current actually flowing through the first coil L1.

As described above, the power converting device 1 includes the totem pole type power factor improving circuit (totem pole PFC) 12, the current detection circuit 17, and the control circuit 16.

The totem pole PFC 12 includes the first coil L1 connected to the first terminal AC1 of the AC power supply AC and the first half-wave switch S1 whose source terminal is connected to the first coil L1 through the first resistance R1 that is the first current detector. The totem pole PFC 12 includes the second half-wave switch S2 whose drain terminal is connected to the first coil L1 through the second resistance R2 that is the second current detector. The first resistance R1 and the second resistance R2 configure the current detection circuit 17. The totem pole PFC 12 includes the first diode D1 in which the cathode is connected to the drain terminal of the first half-wave switch S1 and the anode is connected to the second terminal AC2 of the AC power supply AC, and the second diode D2 in which the anode is connected to the source terminal of the second half-wave switch S2 and the cathode is connected to the second terminal AC2 of the AC power supply AC. The totem pole PFC 12 includes the first smoothing capacitor C1 connected between the cathode of the first diode D1 and the anode of the second diode D2.

The control circuit 16 controls the pulse width of turning on or off the first half-wave switch S1 and second half-wave switch S2, based on the signal IS indicating a total value of the DC voltage applied to the first resistance R1 and the DC voltage applied to the second resistance R2.

According to such a configuration, a value of the current flowing through the first coil L1 appears as a positive value of the signal IS. The control circuit 16 can control the current flowing through the first coil L1 in a sinusoidal shape having the same phase as the phase of the voltage of the AC power supply AC by controlling on or off of the first half-wave switch S1 and the second half-wave switch S2, based on the signal IS. As a result, the power converting device 1 is able to perform high-efficiency power conversion with a simple and easy configuration.

The control circuit 16 obtains the signal IS that is a total value of a result of detecting the DC voltage of the first resistance R1 and a result of detecting the DC voltage of the second resistance R2, based on the GND voltage that is the voltage at the connection point between the drain terminal of the second half-wave switch S2 and the second resistance R2.

The control circuit 16 extracts a positive value as an extraction signal with reference to the GND voltage from the total value and controls the pulse width of turning on or off the first half-wave switch S1 and the second half-wave switch S2 based on the extraction signal.

When there is no value of the extraction signal, the control circuit 16 calculates an interpolation signal by performing interpolation based on the values of past extraction signals and controls the pulse width of turning on or off the first half-wave switch S1 and the second half-wave switch S2 based on the interpolation signal. Accordingly, the power converting device 1 can perform high-efficiency power conversion at high accuracy with a simple and easy configuration.

In the above embodiment, it is described that the second half-wave switch S2 is turned on or off while AC1>AC2 and the first half-wave switch S1 is turned on or off while AC1<AC2, but the embodiment is not limited to this configuration. The control circuit 16 may be configured to turn on the first half-wave switch S1 while AC1>AC2 and the second half-wave switch S2 is turned off and to turn on the second half-wave switch S2 while AC1<AC2 and the first half-wave switch S1 is turned off. That is, the control circuit 16 may be configured to perform synchronous rectification by the first half-wave switch S1 and the second half-wave switch S2.

While AC1>AC2 and the second half-wave switch S2 is turned off, the first half-wave switch S1 functions as a body diode from the source terminal towards the drain terminal. Further, while AC1<AC2 and the first half-wave switch S1 is turned off, the second half-wave switch S2 functions as a body diode from the source terminal towards the drain terminal.

However, the loss when the first half-wave switch S1 is turned on is smaller than the loss of the body diode of the first half-wave switch S1. Further, the loss when the second half-wave switch S2 is turned on is smaller than the loss of the body diode of the second half-wave switch S2. Thus, as described above, the first half-wave switch S1 is turned on while AC1>AC2 and the second half-wave switch S2 is turned off, and the second half-wave switch S2 is turned on while AC1<AC2 and the first half-wave switch S1 is turned off, and thus, it is possible to reduce the loss of the circuit of the totem pole PFC 12.

When the synchronous rectification is performed as described above, pulses appear alternatively in the signal G1G and the signal G2G. Accordingly, the current determiner 37 of the control circuit 16 cannot extract the extraction signal ISE from the signal IS based on the signal G1G and the signal G2G. At this time, the current determiner 37 determines whether to use the signal G1G or the signal G2G for extraction of the extraction signal ISE based on the signal ACP from the polarity detection circuit 33.

Specifically, the current determiner 37 extracts the extraction signal ISE from the signal IS while the first terminal AC1 of the AC power supply AC is at a positive potential and the second half-wave switch S2 is turned on. Further, the current determiner 37 extracts the extraction signal ISE from the signal IS while the second terminal AC2 of the AC power supply AC is at a positive potential and the first half-wave switch S1 is turned on. Accordingly, the control circuit 16 can extract the extraction signal ISE from the signal IS.

Similarly, the first diode D1 and the second diode D2 may each be replaced with MOSFET. Specifically, the first diode D1 may be configured as a body diode of FET that is turned on while AC1>AC2 and turned off while AC1<AC2. Also, specifically, the second diode D2 may be configured as a body diode of FET that is turned off while AC1>AC2 and turned on while AC1<AC2. According to such a configuration, the loss of circuit of the totem pole PFC 12 can be reduced.

The first half-wave switch S1 and the second half-wave switch S2 according to the above embodiment need to be configured in a wide bandgap semiconductor for high-speed switching. However, since the current flowing through the first diode D1 and the second diode D2 is a 50 Hz component that is a frequency of the AC power supply AC, an FET including a silicon semiconductor having a relatively slow reaction can be used when a synchronous rectifying FET is used instead of the first diode D1 and the second diode D2.

When the synchronous rectifying FET is used instead of the first diode D1 and the second diode D2, the cathode sides of the first diode D1 and second diode D2 are replaced with a drain terminal of the FET, and the anode sides of the first diode D1 and second diode D2 are replaced with a source terminal of the FET.

In the above embodiment, it was described that the polarity detection circuit 33 has a configuration for detecting the polarity of the AC voltage supplied from the AC power supply AC based on the signal ACV and outputting the result of the detection as the signal ACP. The polarity detection circuit 33 may be implemented by a combination of a processor and a memory storing a program, or by an analog circuit.

Figure 8:
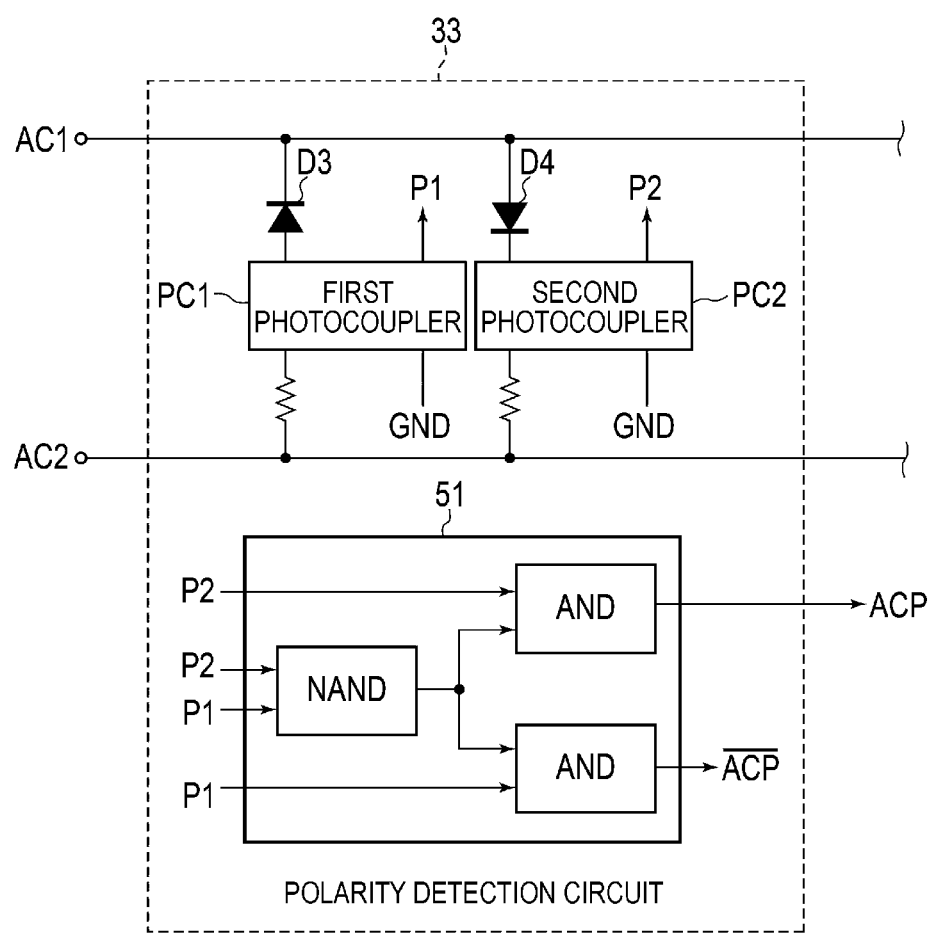
FIG. 8 is a diagram for illustrating an example of another configuration of a polarity detection circuit, according to an embodiment.

An example in which the polarity detection circuit 33 is configured as an analog circuit is shown in FIG. 8. In the example of FIG. 8, the polarity detection circuit 33 is provided outside the control circuit 16 and outputs the signal ACP to the selector 40 and the current determiner 37 of the control circuit 16. The polarity detection circuit 33 includes, for example, a third diode D3, a fourth diode D4, a first photocoupler PC1, a second photocoupler PC2, and a logic circuit 51.

In the third diode D3, the cathode is connected to the first terminal AC1 of the filter circuit 11 and the anode is connected to the cathode of the first photocoupler PC1. In the first photocoupler PC1, the anode is connected to the second terminal AC2 of the filter circuit 11 via a resistance, a collector is connected to GND, and an emitter is connected to the logic circuit 51.

In the fourth diode D4, the anode is connected to the first terminal AC1 of the filter circuit 11 and the cathode is connected to the anode of the second photocoupler PC2. The cathode of the second photocoupler PC2 is connected to the second terminal AC of the filter circuit 11 via a resistance, a collector is connected to GND, and an emitter is connected to the logic circuit 51.

According to such a configuration, when AC1<AC2, the first photocoupler PC1 causes a current to flow from the anode to the cathode to output a signal P1 to the logic circuit 51. When AC1>AC2, the second photocoupler PC2 causes a current to flow from the anode to the cathode to output a signal P2 to the logic circuit 51.

The logic circuit 51 is a circuit that outputs the signal ACP indicating "1" while the signal P2 is supplied from the second photocoupler PC2, and outputs the signal ACP indicating "0" while the signal P1 is supplied from the first photocoupler PC1. For example, the logic circuit 51 includes one NAND and two ANDs. The signal P1 and the signal P2 are input to the NAND. An output of the NAND and the signal P2 are input to a first AND. The output of the NAND and the signal P1 are input to a second AND.

According to such a configuration, the first AND outputs "1" when the signal P2 is input and the signal P1 is not input. The first AND outputs "0" when the signal P2 is not input and the signal P1 is input. That is, an output of the first AND is supplied to the selector 40 and the current determiner 37 of the control circuit 16, as the signal ACP. The second AND outputs "1" when the signal P2 is not input and the signal P1 is input. The second AND outputs "0" when the signal P2 is input and the signal P1 is not input. That is, an output of the second AND is the inverse of the signal ACP.

Other circuits of the control circuit 16 may also be implemented in a logic circuit or a combination of a processor and a program, instead of an analog circuit.

For example, the first comparator 32 and the second comparator 38 may be configured to convert each of two input signals into a digital signal by using AD conversion or the like and to calculate the difference in digital values. The first comparator 32 and the second comparator 38 are implemented by, for example, the following code.

```
Sout = f(Sin1, Sin2)
{
Sout = Sin1 - Sin2;
}
```

Also, the multiplier 36 may be configured to convert each of two input signals into a digital signal by using AD conversion or the like and to perform multiplication in digital values. The multiplier 36 is implemented by, for example, the following code.

```
MUL = f(Sin1, Sin2)
{
MUL = Sin1 * Sin2;
}
```

As described above, when implemented in a combination of a processor and a program, an input signal is converted into a digital signal by using AD conversion or the like, and calculation is performed based on the digital value. When a rear circuit is an analog circuit, a digital signal may be converted into an analog signal by using DA conversion or the like and output as the converted analog signal.

In the above embodiment, it was described that the control circuit 16 is, for example, an arithmetic IC such as a microcomputer or a digital signal processor. Accordingly, there is a restriction that the signal IS input to the control circuit 16 is limited to a voltage between GND and VCC. That is, the control circuit 16 cannot handle a negative value of the signal IS.

Figure 9:
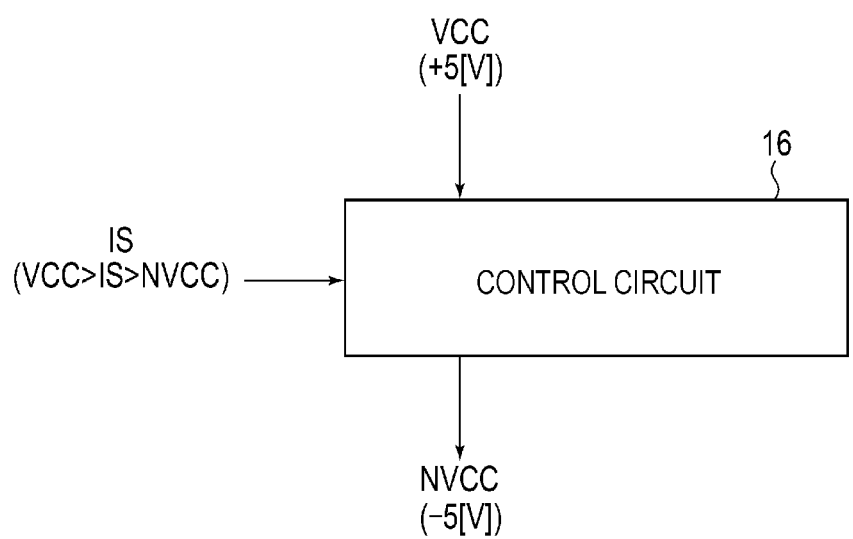
FIG. 9 is a diagram for illustrating an example of another configuration of a control circuit, according to an embodiment.

However, for example, as shown in FIG. 9, GND of the control circuit 16 is a negative value (for example −5 [V]) instead of 0 V, that is, the control circuit 16 is configured as an IC operating in a range of VCC (+5 [V]) to NVCC (−5 [V]). In this case, when the signal IS satisfies NVCC<IS<VCC, the control circuit 16 can calculate an absolute value of the signal IS and control the pulse width of turning on or off the first half-wave switch S1 and the second half-wave switch S2, based on the calculated absolute value of the signal IS.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power converting device, comprising:
a totem pole type power factor improving circuit comprising a coil connected to a first terminal of an AC power supply, a first half-wave switch in which a source terminal is connected to the coil via a first current detector which is a first resistance, a second half-wave switch in which a drain terminal is connected to the coil via a second current detector which is a second resistance, a first diode in which a cathode is connected to a drain terminal of the first half-wave switch and an anode is connected to a second terminal of the AC power supply, a second diode in which an anode is connected to a source terminal of the second half-wave switch and a cathode is connected to the second terminal of the AC power supply, and a smoothing capacitor connected between the cathode of the first diode and the anode of the second diode; and
a control circuit configured to control a pulse width to turn on or off the first half-wave switch and the second half-wave switch based on a total value of a result of detecting a DC voltage of the first current detector and a result of detecting a DC voltage of the second current detector, wherein
the control circuit obtains the result of detecting the DC voltage of the first current detector and the result of detecting the DC voltage of the second current detector with reference to a GND voltage that is a voltage at a connection point between the drain terminal of the second half-wave switch and the second current detector, and
wherein the control circuit extracts, from the total value, a positive value with reference to the GND voltage as an extraction signal and controls the pulse width to turn on or off the first half-wave switch and the second half-wave switch based on the extraction signal.

2. The power converting device of claim 1, wherein if there is no value of the extraction signal, the control circuit calculates an interpolation signal via interpolation based on values of past extraction signals and controls the pulse width to turn on or off the first half-wave switch and the second half-wave switch based on the interpolation signal.

3. The power converting device of claim 1, further comprising:
a polarity detection circuit configured to detect the polarity of an AC voltage supplied from the AC power supply, wherein
the control circuit
extracts the extraction signal from the total value while the first terminal of the AC power supply is at a positive potential and the second half-wave switch is turned on or while the second terminal of the AC power supply is at a positive potential and the first half-wave switch is turned on,
turns on the first half-wave switch while the first terminal of the AC power supply is at a positive potential and the second half-wave switch is turned off, and
turns on the second half-wave switch while the second terminal of the AC power supply is at a positive potential and the first half-wave switch is turned off.

4. The power converting device of claim 1, wherein the control circuit calculates an absolute value of a total value based on the positive or negative of the total value with reference to the GND voltage and controls the pulse width to turn on or off the first half-wave switch and the second half-wave switch based on the absolute value.

5. The power converting device of claim 1, wherein the control circuit:
converts a voltage across the smoothing capacitor into a voltage with reference to the GND voltage that is the voltage at the connection point between the drain terminal of the second half-wave switch and the second current detector, and
controls the pulse width based on the converted voltage.

6. An AC to DC converter for an image forming apparatus, comprising:
a totem pole type power factor improving circuit comprising a coil connected to a first terminal of an AC power supply, a first half-wave switch in which a source terminal is connected to the coil via a first current detector which is a first resistance, a second half-wave switch in which a drain terminal is connected to the coil via a second current detector which is a second resistance, a first diode in which a cathode is connected to a drain terminal of the first half-wave switch and an anode is connected to a second terminal of the AC power supply, a second diode in which an anode is connected to a source terminal of the second half-wave switch and a cathode is connected to the second terminal of the AC power supply, and a smoothing capacitor connected between the cathode of the first diode and the anode of the second diode; and
a control circuit configured to control a pulse width to turn on or off the first half-wave switch and the second half-wave switch based on a total value of a result of detecting a DC voltage of the first current detector and a result of detecting a DC voltage of the second current detector, wherein the control circuit obtains the result of detecting the DC voltage of the first current detector and the result of detecting the DC voltage of the second current detector with reference to a GND voltage that is a voltage at a connection point between the drain terminal of the second half-wave switch and the second current detector, and wherein the control circuit extracts, from the total value, a positive value with reference to the GND voltage as an extraction signal and controls the pulse width to turn on or off the first half-wave switch and the second half-wave switch based on the extraction signal.

7. The AC to DC converter of claim 6, wherein
if there is no value of the extraction signal, the control circuit calculates an interpolation signal via interpolation based on values of past extraction signals and controls the pulse width to turn on or off the first half-wave switch and the second half-wave switch based on the interpolation signal.

8. The AC to DC converter of claim 6, further comprising:
a polarity detection circuit configured to detect the polarity of an AC voltage supplied from the AC power supply, wherein
the control circuit
   extracts the extraction signal from the total value while the first terminal of the AC power supply is at a positive potential and the second half-wave switch is turned on or while the second terminal of the AC power supply is at a positive potential and the first half-wave switch is turned on,
   turns on the first half-wave switch while the first terminal of the AC power supply is at a positive potential and the second half-wave switch is turned off, and
   turns on the second half-wave switch while the second terminal of the AC power supply is at a positive potential and the first half-wave switch is turned off.

9. The AC to DC converter of claim 6, wherein
the control circuit calculates an absolute value of a total value based on the positive or negative of the total value with reference to the GND voltage and controls the pulse width to turn on or off the first half-wave switch and the second half-wave switch based on the absolute value.

10. The AC to DC converter of claim 6, wherein
the control circuit:
   converts a voltage across the smoothing capacitor into a voltage with reference to the GND voltage that is the voltage at the connection point between the drain terminal of the second half-wave switch and the second current detector, and
   controls the pulse width based on the converted voltage.

11. A power converting method in a totem pole type power factor improving circuit comprising a coil connected to a first terminal of an AC power supply, a first half-wave switch in which a source terminal is connected to the coil via a first current detector which is a first resistance, a second half-wave switch in which a drain terminal is connected to the coil via a second current detector which is a second resistance, a first diode in which a cathode is connected to a drain terminal of the first half-wave switch and an anode is connected to a second terminal of the AC power supply, a second diode in which an anode is connected to a source terminal of the second half-wave switch and a cathode is connected to the second terminal of the AC power supply, and a smoothing capacitor connected between the cathode of the first diode and the anode of the second diode, comprising:
   controlling a pulse width to turn on or off the first half-wave switch and the second half-wave switch based on a total value of a result of detecting a DC voltage of the first current detector and a result of detecting a DC voltage of the second current detector,
   obtaining the result of detecting the DC voltage of the first current detector and the result of detecting the DC voltage of the second current detector with reference to a GND voltage that is a voltage at a connection point between the drain terminal of the second half-wave switch and the second current detector; and
   extracting, from the total value, a positive value with reference to the GND voltage as an extraction signal and controlling the pulse width to turn on or off the first half-wave switch and the second half-wave switch based on the extraction signal.

12. The power converting method of claim 11, further comprising:
   if there is no value of the extraction signal, calculating an interpolation signal via interpolation based on values of past extraction signals and controlling the pulse width to turn on or off the first half-wave switch and the second half-wave switch based on the interpolation signal.

13. The power converting method of claim 11, further comprising:
   detecting the polarity of an AC voltage supplied from the AC power supply;
   extracting the extraction signal from the total value while the first terminal of the AC power supply is at a positive potential and the second half-wave switch is turned on or while the second terminal of the AC power supply is at a positive potential and the first half-wave switch is turned on;
   turning on the first half-wave switch while the first terminal of the AC power supply is at a positive potential and the second half-wave switch is turned off; and
   turning on the second half-wave switch while the second terminal of the AC power supply is at a positive potential and the first half-wave switch is turned off.

14. The power converting method of claim 11, further comprising:
   calculating an absolute value of a total value based on the positive or negative of the total value with reference to the GND voltage and controls the pulse width to turn on or off the first half-wave switch and the second half-wave switch based on the absolute value.

15. The power converting method of claim 11, further comprising:
   converting a voltage across the smoothing capacitor into a voltage with reference to the GND voltage that is the voltage at the connection point between the drain terminal of the second half-wave switch and the second current detector; and
   controlling the pulse width based on the converted voltage.

* * * * *